United States Patent Office 3,319,374
Patented May 16, 1967

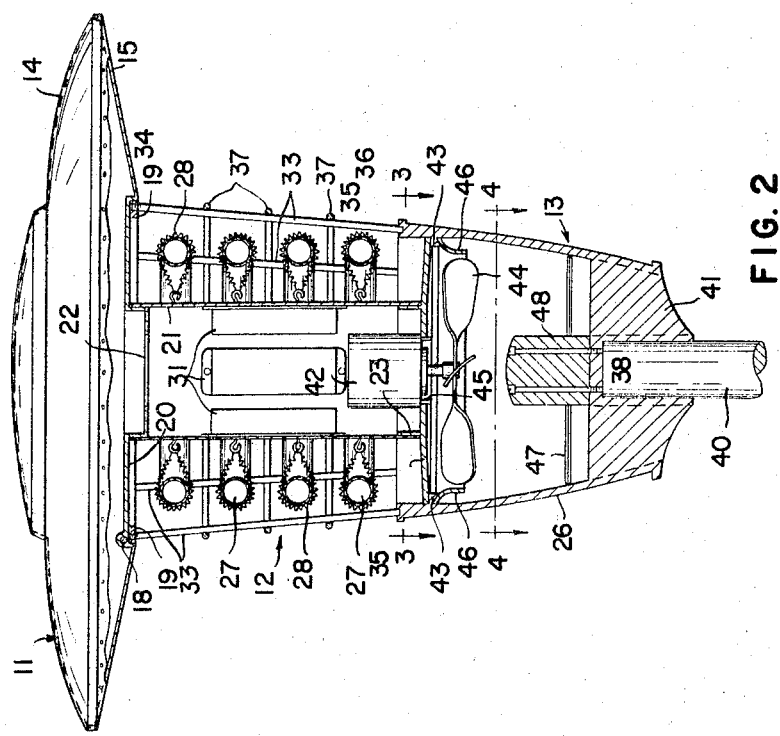
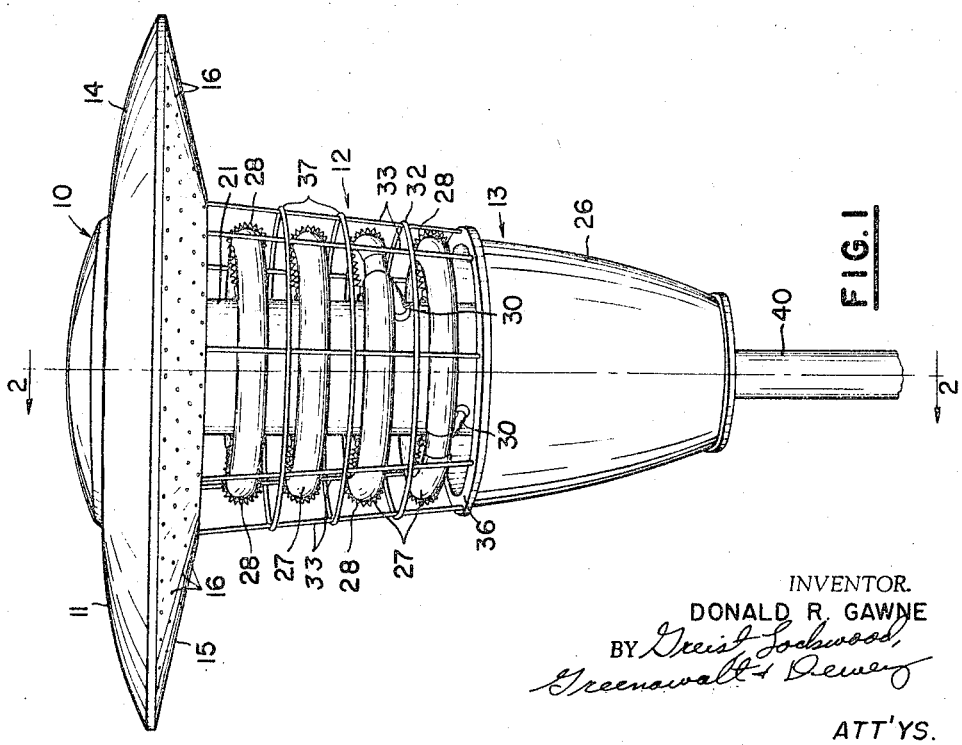

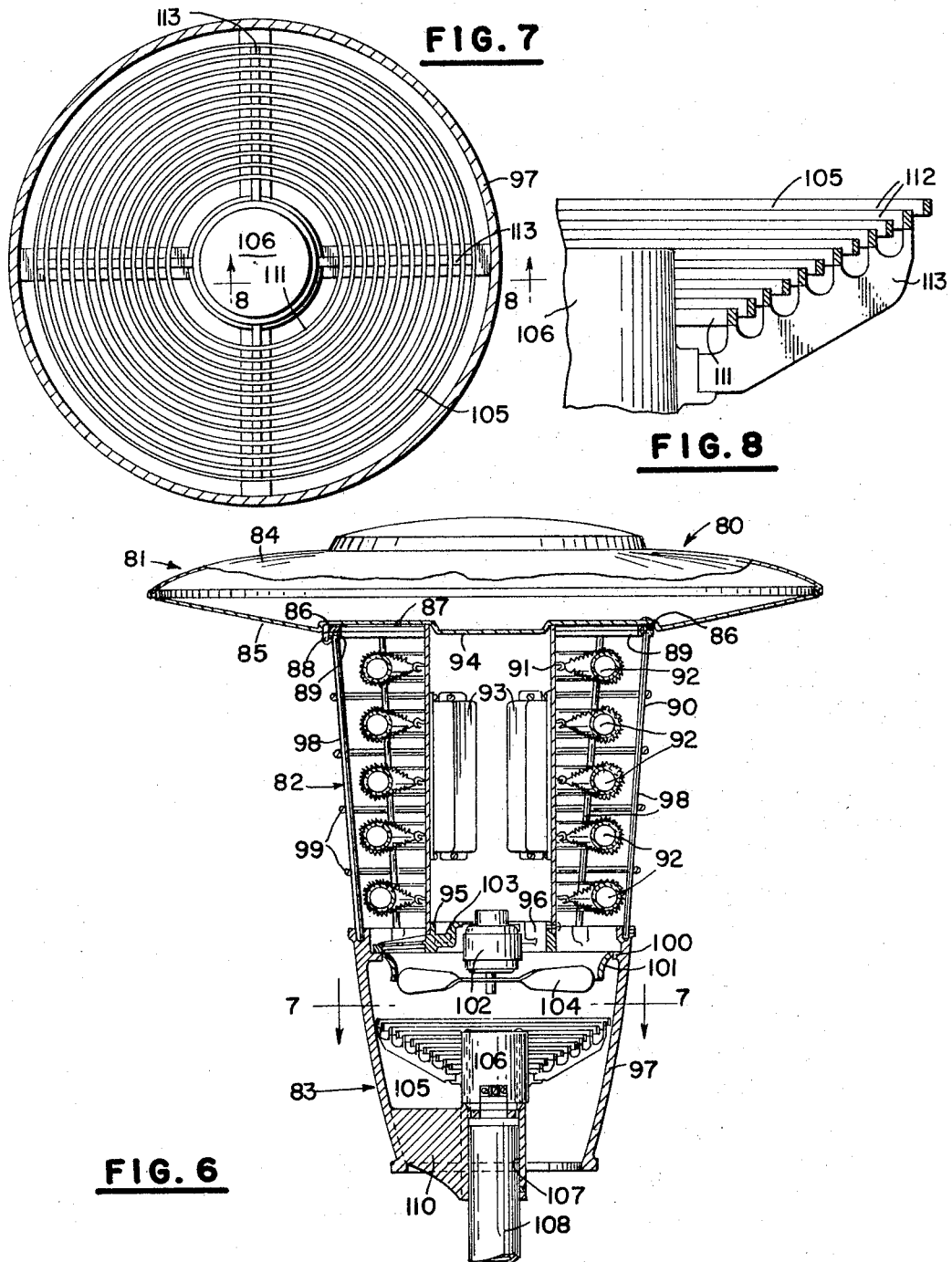

3,319,374
COMBINATION UTILITY LIGHT AND INSECT ATTRACTING AND DESTROYING DEVICE
Donald R. Gawne, Fort Lauderdale, Fla., assignor to QP Corporation, West Palm Beach, Fla., a corporation of Florida
Filed Oct. 6, 1966, Ser. No. 584,851
17 Claims. (Cl. 43—112)

This application is a continuation-in-part of my application Ser. No. 412,113, filed Nov. 18, 1964, and now abandoned.

This invention relates to lighting devices and is more particularly concerned with improvements in a utility light, having incorporated therein means for attracting and destroying insects.

Many forms of electric lighting devices have been provided heretofore which are used primarily for illumination, for example, the ordinary street light, which is designed to illuminate a sizable area, patio and driveway lights, which are usually designed to illuminate a smaller area, parking lot lights, and the like. Also, various devices have been provided which employ light rays to attract insects so as to trap or destroy the latter. In the design of such devices, lamps have been employed which produce so-called "black light," the popular name for near ultra violet energy, which it is well known attracts practically all nocturnal insects. Although in a technical sense this is not light since the human eye is insensitive to it, it is commonly known as "black light" and the most common sources are black light fluorescent lamps and mercury vapor lamps, both of which are readily available commercially. In devices of this character the lamps have been used simply as a source of black light for attracting the insects and usually the devices have included some arrangement whereby the insects attracted by the light are sucked or forced into a collection container and then destroyed. Also, in some of these devices an energized grid has been interposed in the path of travel of the insects so that the latter will be electrocuted on contact with the grid. Many such devices have been objected to because the energized grid has been, of necessity, large and cumbersome and frequently small insects attracted by the light would pass through the grid and escape destruction. Also, the usual practice has been to mount the grid vertically with the result that some of the insects would be contacted and then fall away from it and escape or others would be killed and fall to the ground leaving an unsightly and unwanted mess. Where the grid has been openly mounted it has proven to be unsightly and distasteful in operation and women particularly have objected to the crackling and sizzling of insects directly before their eyes.

A primary object of the present invention is to provide a utility light of improved construction and to incorporate therein a means for attracting and destroying insects which lacks the objectionable features usually found in prior devices provided for this purpose.

A further object of the invention is to provide a utility light having combined therewith insect attracing and destroying elements which are hidden from view and which are more effective in attracting and destroying insects than any previous devices of a similar character.

A more specific object of the invention is to provide an improved utility light having combined therewith a means for attracting and destroying insects wherein the light is adapted to provide adequate illumination for normal utility light purposes, such as illumination of streets, parking lots, patios and the like, while at the same time it is highly effective in attracting undesirable insects and destroying the same so as to produce a minimum of debris which is neither unsightly nor distasteful.

Another object of the invention is to provide a utility light of the character described having insect attracting and destroying elements which are enclosed in a housing so as to be out of sight and arranged so that the insects which are attracted have little chance of escaping destruction and the debris resulting from their destruction which is discharged from the device is not objectionable.

Still another object of the invention is to provide a utility light having combined therewith insect attracting and destroying features which is constructed so that illumination and insect attraction may be provided for by either fluorescent light bulbs or a mercury vapor lamp with a minimum of modification required to convert from the use of one light source to the other.

A still further object of the invention is to provide a utility light having incorporated therein an insect destroying device which includes an electric grid and a suction fan for forcing the insects against the grid, with the fan being mounted in an inverted bell-shaped orifice which provides a venturi effect and serves to reduce the centrifugal force generated by the rotation of the fan so that the insects do not accumulate on the housing adjacent the fan blade tips which otherwise would occur and interfere with the movement of the air or clog the orifice so as to stop the operation of the fan.

Another object of the invention is to provide a combination utility light and insect attracting and destroying device which incorporates therein an improved electrical grid which is effective for destroying hard shell insects which are not readily incinerated.

A further object of the invention is to provide a utility light of the character described which is sturdy in construction, completely safe in use and which will withstand the effects of weather.

These and other objects and advantages of the invention will be apparent from a consideration of the several forms of utility light which are shown by way of illustration in the accompanying drawings wherein:

FIGURE 1 is a perspective view of a utility light having combined therewith means for attracting and destroying insects which embodies the principal features of the invention;

FIGURE 2 is a sectional view taken substantially on the line 2—2 of FIGURE 1;

FIGURE 6 is a sectional view, similar to FIGURE 2, showing a further modification form of the combination utility light and insect destroying device;

FIGURE 7 is a cross section taken on the line 7—7 of FIGURE 6; and

FIGURE 8 is a fragmentary section taken on the line 8—8 of FIGURE 7, to a larger scale.

Figure 3:
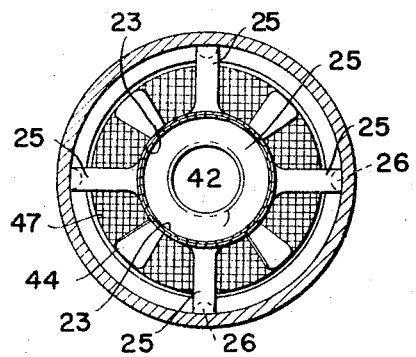
FIGURE 3 is a sectional view taken on the line 3—3 of FIGURE 2.

Referring to FIGURES 1 and 2 of the drawings, there is illustrated a utility light 10 which comprises a canopy-forming top section 11, an intermediate lamp or light bulb supporting section 12, and an insect destroying bottom section 13.

The top section 11 of the light comprises two dish-shaped members 14 and 15 formed of light aluminum or similar material. The topmost member 14 is imperforate while the bottommost member 15 is provided with a plurality of openings 16 for air circulation. The two members 14 and 15 are joined at their periphery and form a hollow canopy which is hinged at 18 to a ring member 19 forming the uppermost portion of the bulb supporting section 12. The ring member 19 is normally seated in the outermost portion of an inwardly recessed section 20 in the center of the lowermost top member 15 when the top 11 is in normal closed position.

The intermediate section 12 comprises a center cylindrical tube member 21 which forms a lamp or bulb supporting column and which may be a section of extruded aluminum tubing or similar rigid material. The supporting column 21 is stabilized at its top by a depending cylindrical extension 22 in the center of the bottom member 15 of the top section 11 when the latter is in closed position which extension 22 is apertured to permit the flow of air down through the column 21. At its bottom end the column 21 fits over a cylindrical flange 23 upstanding on a spider 25 which is fitted in the top opening of a hollow housing 26, the latter forming the main body of the insect destroying bottom section 13 of the device.

The column forming cylindrical tube member 21 serves as a support for a plurality of circular fluorescent lamp bulbs 27 which are arranged in horizontal planes and spaced vertically around the tube member 21. The lamp bulbs 27 are secured in place by a plurality of holders 28 which are in the form of spring loops affording a limited degree of flexibility. The lamp bulbs 27 are also supported to some extent by leads 30 which connect each bulb with a transformer 31 mounted on the inside wall of the tube member 21. A protective cage 32 surrounds the lamp bulbs 27 and is formed by peripherally spaced, vertical rods 33 having their upper ends seated in threaded relation in suitable apertures 34 provided in circumferentially spaced relation in the top ring member 19. The vertical rods 33 have their lower ends seated in socket forming apertures 35 in the top rim forming portion 36 of the bottom housing 26. The vertical rods 33 are connected together by a plurality of concentric ring members 37 which are vertically spaced along the outside of the rods 33 and are brazed or otherwise secured thereto. The vertical rods 33 may be secured in any desired manner in the sockets 35 so as to permit ready separation of the cage from the housing 26.

Figure 4:
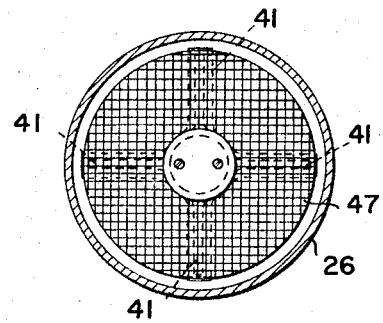
FIGURE 4 is a sectional view taken on the line 4—4 of FIGURE 2.

The insect destroying bottom section 13 of the device comprises the housing forming member or outside casing 26 which has a vertically extending bottom socket formation 38 enabling the device to be secured on the top of a supporting post or column 40. The socket formation 38 is connected to the vertical side walls of the casing 26 by radiantly extending web formations 41 (FIGURE 4) which may be a plurality of thin vertical plates. At the upper end of the casing 26 a fan assembly 42 is supported on the spider 25, the latter being mounted in the top of the casing on an inwardly extending annular flange or rib 43. The fan assembly 42 is mounted so that the fan blades 44 rotate in a plane below the spider 25 and in an orifice or throat formed by an inverted bell-shaped member 45 which is also supported on the annular rib 43. The curved annular flange forming member 45 has a downwardly extending marginal portion 46 which is spaced a relatively small distance outside the path of the tips of the fan blades 44 and which is adapted to cooperate with the fan blades 44 in producing a venturi effect, so that insect laden air which is sucked down past the lamp supporting cylinder 21 flows freely through the orifice formed by member 45 and drives the insects against a horizontally disposed electric grid 47 mounted in spaced relation below the fan blades 44. A transformer 48 for the grid 47 is mounted in the bottom of the housing 26 and completes the assembly.

The transformers 31 for the light bulbs, the motor for the fan assembly 42, and the transformer 48 for the grid are wired in an appropriate manner with a suitable connection for plugging into an electric supply line. Means is provided for disconnecting the grid and the fan from the current supply so as to permit the light to be used solely for illumination.

When in use, the light is set up in the area in which illumination and insect elimination is desired. When connected to a suitable source of electric power, the light bulbs 27 will provide adequate illumination, with the bottom face of the top member 15 and the lamp column 21 serving as a reflector for the lamps. A mixture of ordinary fluorescent bulbs and black light producing fluorescent bulbs may be employed, the ratio being dependent upon the desired amount of illumination. Insects are attracted by the black light rays and drawn by the suction created by the fan blade 44 through the spider 25 and the orifice forming member 45 and propelled against the grid 47 where they are cremated with the resultant waste or ash, which will be a minimum amount per insect, falling between the bars of the grid 47 and out of the bottom of the casing 26 between the vertical bottom webs 41. The throat or orifice arrangement created by the bell-shaped member 45 provides a venturi effect which greatly reduces the tendency of the insects to be thrown out by the centrifugal force created by the fan blades 44 and prevents any undesirable pile-up of the insects adjacent the tips of the blades 44. The fan blades 44 draw air through the top section 11 and down through the lamp supporting tube or cylinder 21 which not only serves to cool the transformers 31 and prevent overheating of the same but also adds to the volume of air flowing through the restricted opening or orifice defined by the member 45 and insures that all the insects will be projected against the grid 47. The horizontally disposed grid 47 is rigidly mounted and the electrodes are relatively short so that the spaces between the same may be made rather small without danger of the electrodes being thrown together and short circuited by jolting or jarring the device. This insures that practically all insects regardless of their size will be electrocuted and destroyed, the larger insects being held on the grill 47 until reduced to an unobjectionable ash which will fall out of the bottom of the casing 26 with the help of the air flow produced by the fan blades 44.

Figure 5:
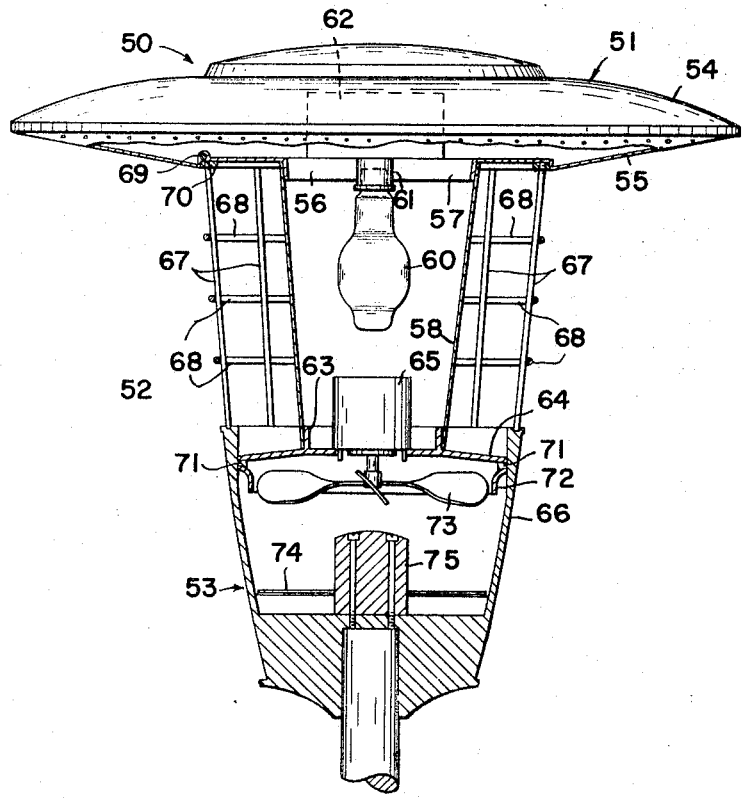
FIGURE 5 is a sectional view, similar to FIGURE 2, showing a modified form of the utility light in which a mercury vapor lamp is employed as a light producing source.

Referring to FIGURE 5, there is illustrated a form of the device which is adapted to utilize a mercury vapor lamp bulb for illumination and insect attraction. Also, this modification, indicated at 50, illustrates the ease with which the device of FIGURE 1 may be converted for utilizing another type of illumination and "black light" producing lamp bulb is place of the fluorescent lamps. In this form there is a top canopy forming section 51 which is slightly modified, an intermediate lamp supporting section 52 which is also modified and a bottom insect destroying section 53 of the same construction as the corresponding bottom section shown at 13 in FIGURES 1 and 2. The canopy forming top section 51 is constructed as shown in FIGURES 1 and 2 with a dish-shaped top member 54 connected at its periphery with a bottom member 55. The center portion of the bottom member 55 has an opening 56 defined by a depending annular flange 57 which is adapted to fit into the top end of a vertically disposed bulb enclosing member 58 which in this form of the light is of truncated cone shape and of transparent or translucent material so as to utilize fully the illumination provided by the mercury lamp bulb 60 which is supported in a socket 61 at the top of the cylindrical member 58. The lamp socket 61 and an accompanying transformer 62 may be supported by suitable brackets (not shown) in the top section 51 or the intermediate section 52. The lamp enclosing member 58 is telescoped at its bottom end over an upstanding flange 63 in the center of a spider 64 supporting the fan assembly 65 in the top of the bottom housing or casing 66. The outside cage which comprises vertical wire rods or bars 67 connected by spaced horizontal rings 68 of the same material provides additional protection against breakage for the globe or chimney forming cylindrical member 58 and the mercury lamp 60 and supports the top section 51 which is hinged at 69 to the top ring 70 thereof. The spider support 64 for the fan assembly 65 is mounted on the annular flange 71 in the casing 66 which also supports the inverted bell-shaped member 72 forming an orifice or throat in which the fan blades 73 rotate. A horizontally disposed grid 74 and associated transformer 75 are mounted in the casing 66 which is of the same construction as in the form of the device in FIGURES 1 to 4. Other details of this form of the device which are not described are the same as described with respect to the device of FIGURES 1 to 4 and it is adapted to be used in an identical manner.

A further modification of the light is illustrated in FIGURES 6 to 8. The light 80 which is illustrated comprises the top section 81, the lamp section 82 and the insect destroying section 83 which are arranged vertically in the order named, the general arrangement being the same as in the forms of the light previously described.

The top section or canopy 81 comprises the upper dish-shaped imperforate member 84 which is joined at its marginal edges to the lower dish-shaped member 85, the latter having holes or perforations in at least the center area thereof for circulation of air. An annular reinforcing ring 86 of smaller diameter is secured in the outer margin of a recessed portion 87 of the bottom member 85 and connected by a hinge 88 to an annular ring 89 of the same diameter forming the top member of the cage 90 which forms the outer portion of the lamp section 82. The diameter of the top section 81 is substantially greater than the diameter of the lamp section 82 and the portion of the lower face of the top section 81 which overhangs the lamp section 82 forms a reflector for the light rays.

The lamp section 82 comprises a center cylinder 91 on which there is mounted in the same manner as in the device shown in FIGURES 1 and 2 a plurality of circular fluorescent light bulbs 92 with associated transformers 93 being mounted on the inside wall of the cylinder 91 which forms a compartment for housing the transformers. The open top of the cylinder 91 is adapted to receive an extension 94 formed in the bottom member 85 of the top section 81, which extension 94 is apertured to permit the flow of air down through the light column 91. The cylindrical member 91 is telescoped over an upstanding flange formation 95 on a fan supporting spider 96 in the top of the insect destroying section 83 which flange is spaced inwardly of the outer wall of the section 83. The cylinder 91 may be removably secured to the spider by a set screw or any appropriate fastening element. The outer cage 90 comprises circumferentially spaced, vertically spaced bars 98 and connecting vertically spaced ring members 99 with the vertical bars connected at the top to ring 89 and removably connected at the bottom to the top edge of housing member 97.

The insect destroying section 83 comprises the housing forming member 97 having an inwardly extending annular shoulder or rib 100 for supporting the fan mounting spider 96 and an inverted bell-shaped orifice or throat forming member 101. The fan assembly 102 is supported on circumferentially spaced radial ribs 103 in the spider 96 and the latter is apertured in the area below the light bulbs 92 and between the outer wall of the cylinder 91 and the outer wall of the housing 97 so as to provide for passage of air into the compartment formed by the housing 97. The fan assembly 102 is arranged so that the blades 104 are positioned in the orifice formed by the member 101 in the same manner as in FIGURES 1 and 2. An electrical grid 105 (FIGURES 6 to 8) of special construction is spaced below the fan blades 104 and extends about the transformer 106 which is mounted in the center of the housing 97 and above the socket formation 107 provided for receiving a supporting post 108. The socket formation 107 is joined to the inner walls of the housing 97 by a plurality of radially extending ribs 110. The grid 105 has a conical shape as shown with a center opening 111 of greater diameter than the transformer 106 so as to provide for passage of insect debris which is not reduced to ash form and which is too large to pass between the concentrically arranged circular bars 112 which form the electrodes of the grid and which are supported on connecting radial arms 113 extending from the transformer 106. The grid 105 is cone-shaped so that it acts after the fashion of a funnel and large insects such as beetles having a hard shell which is not reduced to ash by the electrodes will slide down the inside surface and pass through the center opening 111. Smaller insects will, of course, be cremated and reduced to an unobjectionable ash as in the form of the grid heretofore described. The larger insects will be held on the sloping inner surface of the grid a sufficient length of time for cremation and reduction to an unobjectionable ash which will pass through the grid bars with the help of the air current created by the fan blades 104 while any hard body drawn into the air stream by the suction effect of the fan blades 104 will tumble or slide down the sloping surface of the grid and pass through the opening 111 for discharge from the bottom of the housing 97 between the radial ribs 110.

The modified form of the device which is shown in FIGURES 6 to 8 may, of course, be converted to the use of a mercury lamp bulb in the same manner as in the modification shown in FIGURE 5.

In all forms of the device the canopy forming top section which is of greater diameter than the lamp holding section is hinged to the lamp holding section so as to form in the closed position a protective cover and partial reflector over the lamp and insect destroying assemblies. At the same time, the cover section may be readily swung open for servicing or replacement of light bulbs, transformers, fan assembly and other elements in the lamp holding and insect destroying sections of the device. If desired, a suitable lock or latch may be added to hold the top section in the closed position. Also, in all forms of the device a transparent or translucent shield of plastic or similar sheet material may be provided for insertion immediately within the protective cage which extends about the lamp holding or enclosing center cylinder member. The fan blades are, in all forms of the device, mounted within an orifice or throat forming, inverted bell-shaped or frusto-conical member which produces a venturi effect on the air stream resulting from the operation of the fan and eliminates any pile-up of insects at the ends of the fan blades. The insects are driven onto the grid which is either horizontal or funnel-shaped so as to insure that the insects will be cremated and reduced to an inoffensive ash which the air stream insures will be discharged from the device.

While particular materials and specific details of construction have been referred to in describing the several forms of the device which are illustrated, it will be understood that other materials and equivalent structural details may be resorted to within the spirit of the invention.

I claim:
1. A combination utility light and insect attracting and destroying device comprising
   (a) a hollow cover member having a bottom wall with openings therein,
   (b) means forming a top compartment disposed in a vertical position below said hollow cover member with the top thereof in open communication with the inside of said hollow cover member,
   (c) at least one lamp supported near the upper end of said top compartment,
   (d) means forming a bottom compartment disposed below and in vertical alignment with said top compartment and in open communication therewith,
   (e) a suction fan supported in said bottom compartment which is arranged to drive air downwardly in a vertical direction, and

(f) a frusto-conical member positioned in the top of said bottom compartment with its larger end uppermost, and its smaller end merging into a cylindrical section of small axial dimension which surrounds the fan blades and forms a restricted opening constituting a throat for drawing air downwardly through the top compartment and also through openings between the outer wall at the lower end of the top compartment forming means and the upper end of the bottom compartment forming means.

2. A combination utility light and insect attracting and destroying device as recited in claim 1, and said top compartment forming means having a bottom opening which is substantially smaller than the top opening in said bottom compartment forming means and a circular lamp mounted adjacent the bottom opening of said top compartment forming means and encircling the outer wall thereof.

3. A combination utility light and insect attracting and destroying device as recited in claim 2, and a lamp protecting wire-like cage formation extending upwardly of the outer wall of said bottom compartment forming means to the bottom wall of said cover member in outwardly spaced relation to the outer wall of said top compartment forming means.

4. A combination utility light and insect attracting and destroying device comprising
 (a) an elongated, vertically disposed housing open at its top and bottom ends,
 (b) said housing comprising a first tubular member disposed below a second tubular member which is of lesser cross section than said first tubular member,
 (c) a removable cover member on the open top of said second tubular member,
 (d) at least one lamp positioned near the top of said second tubular member,
 (e) a suction fan mounted on a spider in the top of said first tubular member so as to suck air downwardly from the inside and along the outside of said second tubular member,
 (f) said fan disposed with the blades moving in a horizontal plane,
 (g) a frusto-conical member positioned with its larger end uppermost and extending downwardly from adjacent the top edge of said first tubular member and terminating at its lower end in a tubular portion having a small axial dimension which encircles the fan blades in closely spaced relation thereto and which is in substantially the same horizontal plane so as to form an air passageway having a cross section smaller than the cross section at the top of said first tubular member, and
 (h) a horizontally disposed electrical grid forming an insect incinerating means located in said first tubular member and extending across the path of the air stream produced by said fan so that the insects drawn into the air stream are driven against the grid and the resulting residue is discharged by passing through the grid and out of the open bottom end of the housing.

5. A combination utility light and insect attracting and destroying device as recited in claim 4, and said second tubular member being connected at its lower end to said fan carrying spider above the larger end of said frusto-conical member so that air is drawn by said fan blades through openings between the bottom edge of said second tubular member and the top edge of said first tubular member.

6. A combination utility light and insect attracting and destroying device comprising
 (a) a hollow cover member having air circulating openings in a surface thereof,
 (b) a substantially cylindrical member disposed in a vertical position below said cover member with the top thereof in open communication with the inside of said hollow cover member,
 (c) at least one lamp near the top of said vertical member,
 (d) a second substantially cylindrical member below and in vertical alignment with said first substantially cylindrical member,
 (e) said substantially cylindrical members being in open communication with each other,
 (f) a suction fan in said second substantially cylindrical member which is disposed in a position to discharge downwardly in a vertical direction,
 (g) a throat forming member located inside said second substantially cylindrical member and having a cylindrical bottom portion in substantially the same horizontal plane with said fan blades and spaced a relatively small distance from the ends of said blades so as to form a restricted opening through which air is drawn by said fan,
 (h) insect destroying means located in said second substantially cylindrical member below said suction fan, and
 (i) support means for said device.

7. A combination utility light and insect attracting and destroying device as defined in claim 6 and
 (a) said insect destroying means comprising an electrically energized grid mounted in a horizontal plane.

8. A combination utility light and insect attracting and destroying device as defined in claim 6 and
 (a) said insect destroying means comprising an electrically energized grid having a funnel-like shape.

9. A combination utility light and insect attracting and destroying device as defined in claim 6 and
 (a) a plurality of circular lamps encircling said first substantially cylindrical member.

10. A combination utility light and insect attracting and destroying device as defined in claim 6 and
 (a) a protective cage surrounding said first cylindrical member in outwardly spaced relation thereto.

11. A combination utility light and insect attracting and destroying device as defined in claim 6 and
 (a) said cover member being of larger diameter than the top of said first cylindrical member so that a bottom portion of said cover member reflects the light rays from said lamp.

12. A combination utility light and insect attracting and destroying device as defined in claim 6 and
 (a) said lamp being disposed inside said first substantially cylindrical member.

13. A combination utility light and insect attracting and destroying device comprising
 (a) an open ended substantially cylindrical bottom housing disposed with its axis generally vertical,
 (b) an elongate substantially cylindrical, open ended lamp member of smaller diameter than the bottom housing extending upwardly of said bottom housing in axial alignment therewith,
 (c) a protective cage extending upwardly of the outer wall of said bottom housing in outwardly spaced relation to said cylindrical lamp member,
 (d) a canopy-like top cover member mounted on the upper end of said cage so that it may be removed to provide access to the interior of said cylindrical lamp member and said cage,
 (e) at least one lamp bulb supported near the top of said cylindrical lamp member,
 (f) a suction fan mounted within the upper end of said bottom housing,
 (g) a throat forming member at the upper end of said bottom housing having an inverted bell-like shape with the small diameter end in substantially the same horizontal plane as the blades of said suction fan and spaced a small distance from the ends of the blades so as to provide a restricted opening and producing a venturi effect on the air stream resulting from operation of the fan, (h) an electric grid in said bottom housing and extending across the path of the air stream below the fan so that insects drawn into the air stream are driven against the grid.

14. A combination utility light and insect attracting and destroying device as recited in claim 13 and
  (a) said top cover member being of larger diameter than said cage so as to provide a reflector forming bottom surface portion extending outwardly around the top of said cage.

15. A combination utility light and insect attracting and destroying device as recited in claim 13 and
  (a) said top cover member having a central downward extension on its bottom face which fits into the open top of said cylindrical lamp member when said top cover member is in closed position.

16. A combination utility light and insect attracting and destroying device as recited in claim 13 and
  (a) said cylindrical lamp member being connected at its lower end to an upstanding flange portion on a fan mounting member in the upper end of said bottom housing.

17. A combination utility light and insect attracting and destroying device as recited in claim 13 and
  (a) said electric grid being in the form of a funnel with the larger diameter top portion in a transverse plane adjacent the fan so as to present a downwardly inclined face against which the insects are driven by the air stream.

References Cited by the Examiner
UNITED STATES PATENTS

| | | | |
|---|---|---|---|
| D. 189,782 | 2/1961 | Richardson | 43—113 X |
| 1,583,975 | 5/1926 | Hunt | 43—139 |
| 1,770,626 | 7/1930 | Richards | 43—113 |
| 2,931,127 | 4/1960 | Mayo | 43—139 |
| 3,041,773 | 7/1962 | Gagliano | 43—139 |
| 3,123,933 | 3/1964 | Roche | 43—139 |
| 3,196,577 | 7/1965 | Plunkett | 43—139 |
| 3,201,893 | 8/1965 | Gesmar | 43—139 |

SAMUEL KOREN, *Primary Examiner.*

WARNER H. CAMP, *Examiner.*